United States Patent [19]

Eberle

[11] 4,135,145

[45] Jan. 16, 1979

[54] ERROR DETECTING CIRCUIT FOR A TRAFFIC CONTROL SYSTEM

[75] Inventor: Terrence F. Eberle, Scottsdale, Ariz.

[73] Assignee: Solid State Devices, Inc., Phoenix, Ariz.

[21] Appl. No.: 720,841

[22] Filed: Sep. 7, 1976

[51] Int. Cl.[2] .................... B60Q 9/00

[52] U.S. Cl. .................... 340/46; 340/41 R; 340/642

[58] Field of Search .................... 340/46, 41 R, 248 E, 340/251, 35, 641, 642; 315/129, 130, 136; 235/150, 24; 364/436

[56] References Cited

U.S. PATENT DOCUMENTS

| | | | |
|---|---|---|---|
| 2,166,721 | 7/1939 | Jeffers | 340/46 |
| 3,596,239 | 7/1971 | Hata | 340/46 |
| 3,629,802 | 12/1971 | Clark et al. | 340/46 |
| 3,648,233 | 3/1972 | Clark | 340/46 |
| 3,778,762 | 12/1973 | Jarko et al. | 340/46 |
| 3,902,156 | 8/1975 | Hill | 340/41 R |
| 4,024,528 | 5/1977 | Boggs et al. | 340/310 A |

*Primary Examiner*—John W. Caldwell, Sr.
*Assistant Examiner*—James J. Groody
*Attorney, Agent, or Firm*—Harry M. Weiss

[57] ABSTRACT

An error detecting circuit which senses the operating states of a plurality of traffic signal lights the energization of which is controlled by a single block of load switches and which circuit produces an error signal when certain predetermined relations exist for a predetermined period of time between the states of the lights, such as, if more than one traffic signal light of one traffic signal head is energized simultaneously or if none of the traffic signal lights of one traffic signal head is energized.

17 Claims, 3 Drawing Figures

| GREEN | YELLOW | RED | DESIRED OUTPUT "A" |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

Fig-3

ERROR DETECTING CIRCUIT FOR A TRAFFIC CONTROL SYSTEM

BACKGROUND OF THE INVENTION

1. Field of the Invention

This invention is in the field of traffic control systems in which signals from a traffic controller are applied to load switches to cause the load switches to energize traffic signal lights to regulate the flow of potentially conflicting vehicular traffic. More particularly, this invention relates to circuits for detecting the status of one group of traffic signal lights which control automobile traffic on one highway (non-intersecting traffic generally referred to as a single phase of traffic), for producing an error or fault signal if the lights of such group overlap for more than a predetermined period of time or if none of them are energized for more than a predetermined period of time, and for identifying the group of lights the status of which produced the error signal.

2. Description of the Prior Art

The use of traffic signal lights to control the flow of traffic, particularly at the intersection of two or more streets or highways, is well known. The traffic signal lights controlling traffic at one intersection are typically controlled by a local traffic controller which is programmed to produce control signals which are applied to load switches. The load switches in turn energize and de-energize, or turn on and turn off, the traffic signal lights of the system. Typically, one load switch controls one or more traffic lights which are connected in parallel with a source of electrical power, normally AC. The lights controlling the flow of traffic on one street (single phase traffic) are grouped together physically and logically. As a typical minimum, such a group of lights would consist of a single traffic signal head with a minimum of one red, one yellow and one green signal light for controlling traffic coming from a single direction, and would most likely include a second red, yellow and green signal light coupled in parallel with the first red, yellow and green signal light for controlling traffic coming from an opposite direction. Obviously, other types of lights such as left turn, right turn, etc., can also be included and if they are, there would be a separate load switch for each such type. In the typical minimum configuration, one load switch would be associated with each of the red, yellow and green lights of a single traffic head and the load switches for one signal head would constitute a group or block, of such switches.

The prior art has recognized that problems can arise in the operation of traffic control systems such as the simultaneous energization of the green signal lights of two intersecting streets which could cause accidents in the intersection instead of preventing accidents, assuming drivers would, or could, always obey the signals.

In U.S. Pat. No. 3,629,802 issued Dec. 21, 1971, entitled, CONFLICTING PHASE ERROR DETECTOR, by L. K. Clark et al., command signals produced by the local traffic controller which are applied to load switches are also applied to a logic circuit. When the occurrence of coincident command signals is detected which could cause conflicting traffic movement, an error signal is produced which is normally employed to cause all the yellow or red signals, or a combination thereof, to flash on and off.

In U.S. Pat. No. 3,648,233 which issued on Mar. 7, 1972 and is entitled, LOAD CONTROL ERROR DE- TECTOR, by L. K. Clark, the problem solved is the possibility of traffic signal lights of a traffic control system being energized in the absence of a command signal being applied to the load switches for energizing a traffic signal light. An error detector is connected to the controller and to a conductor between a traffic signal light and its load switch, which conductor is a part of the circuit for energizing the signal light. The error detector produces an error signal if the traffic signal light is energized and no control signal is supplied to the corresponding load switch. An error signal when produced will cause the traffic control system to assume a flashing mode until someone services the system to eliminate the problem.

The relevant prior art has been primarily concerned with detecting malfunctions of the traffic controller which could potentially result in conflicting command signals being issued by the traffic controller and the energization of a traffic signal when no command for that light to be energized has been applied to the load switch controlling the energization of the signal light.

The prior art does not recognize or address the problem of detecting certain malfunctions that can cause the traffic signal lights controlled by one group of load switches to overlap; i.e., for two or more different colored signal lights controlling the flow of a single phase of traffic on one street, for example, to both be energized for a period of time greater than that specified for the yellow and green lights to overlap. Another problem that is not recognized or solved is the failure of a signal light to be energized at any time during operation because, for example, a signal light has failed, a load switch has failed, the circuit linking the signal light to the load switch has failed, or the source of the electrical energy may have failed.

Another problem the prior art does not recognize is that of how to quickly identify the source of the failure of the traffic control system. Finding the cause of a failure can be difficult and time consuming, particularly when encountered with a complex traffic control system that is operating in a flashing mode. To minimize this problem of identifying the cause of the problem, applicant's invention provides a visual signal that will identify to the serviceman the group of traffic signal lights and their associated load switches that were the source of the error.

SUMMARY OF THE INVENTION

The present invention provides an error detection circuit for a traffic control system. The error detection circuit is electrically connected to energizing circuits for turning on and off the traffic signal lights controlling the flow of a single phase of traffic on one of a plurality of intersecting streets, for example. The energizing circuit for each traffic signal light includes a load switch and a source of electromotive force. Each load switch energizes and de-energizes the signal lights connected in parallel with it in response to command and control signals applied to the load switch from a traffic controller.

Whenever a signal light associated with a group of signal lights is energized, AC to DC converter circuits of the detector circuit will produce logic signals, such signals having one value to indicate that traffic signal light is energized and another value to indicate that the traffic signal light is not energized. Logic signals are produced for each type of traffic signal light, or load switch, of each group of such lights controlling the flow of traffic on one street. Each error detector circuit includes a logic circuit to which the aforementioned logic signals are applied. The logic circuit will produce an error signal if certain predetermined conditions exist. These conditions are if more than one signal light of a given type which control a given function such as a red, a green or a yellow traffic signal light is on, or energized, at one time, or if all such signal lights are off at one time. A delay circuit to which the error signal is coupled prevents any action being taken unless the undesired status lasts longer than the predetermined delay provided by the delay circuit. If a predetermined condition persists continuously for the period provided by the delay circuit, the error signal is applied to a latch circuit which causes a visual indicator to be energized and remain energized as long as power is applied. The latch circuit will cause an error, or fault, signal to be produced which in most systems is connected back into the central control system to cause the traffic control system to go into its error mode, or in other words, for the yellow or red signal lights, or a combination thereof, in the system to flash on and off. The presence of a fault signal can also be used to signal a central station that a fault has occurred at a given traffic control system or intersection so that a serviceman can be sent to repair the system.

From the foregoing, it is apparent that the error detection circuit of my invention senses the operating states of the traffic signal lights controlled by a group, or block, of load switches to produce an error signal when certain predetermined relations exist for more than a predetermined period of time. Further, the error detection circuit provides a visual indication of the group of traffic signal lights and their associated load switches which were the cause of the relations determined to be undesirable to the operation of the traffic control system.

It is therefore an object of this invention to provide an error detecting circuit for a traffic control system which detects the operational states of the circuits energizing the traffic signal lights of a single traffic signal head and produces an error signal upon the occurrence or the failure to occur of certain operational states of said circuits.

It is another object of the invention to provide an error detection circuit for a traffic controller which detects if more than one traffic signal light of one traffic signal head is energized simultaneously for more than a predetermined period of time.

Still another object of this invention is to provide an error detection circuit for a traffic controller which detects if none of the traffic signal lights is energized for a predetermined time and produces an error signal upon the occurrence of such an event.

It is yet another object of this invention to provide an error detection circuit for a traffic control system which when it detects the existence of certain predetermined conditions in the operational states of the traffic signal lights controlled by a given block of load switches, will produce a visual signal identifying the block of load switches and the signal lights controlled by the switches in which one of said predetermined conditions existed.

BRIEF DESCRIPTION OF THE DRAWINGS

Other objects, features, and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 is a truth table describing the operation of the logic circuit of the error detection circuit.

DESCRIPTION OF THE PREFERRED EMBODIMENT

Figure 1:
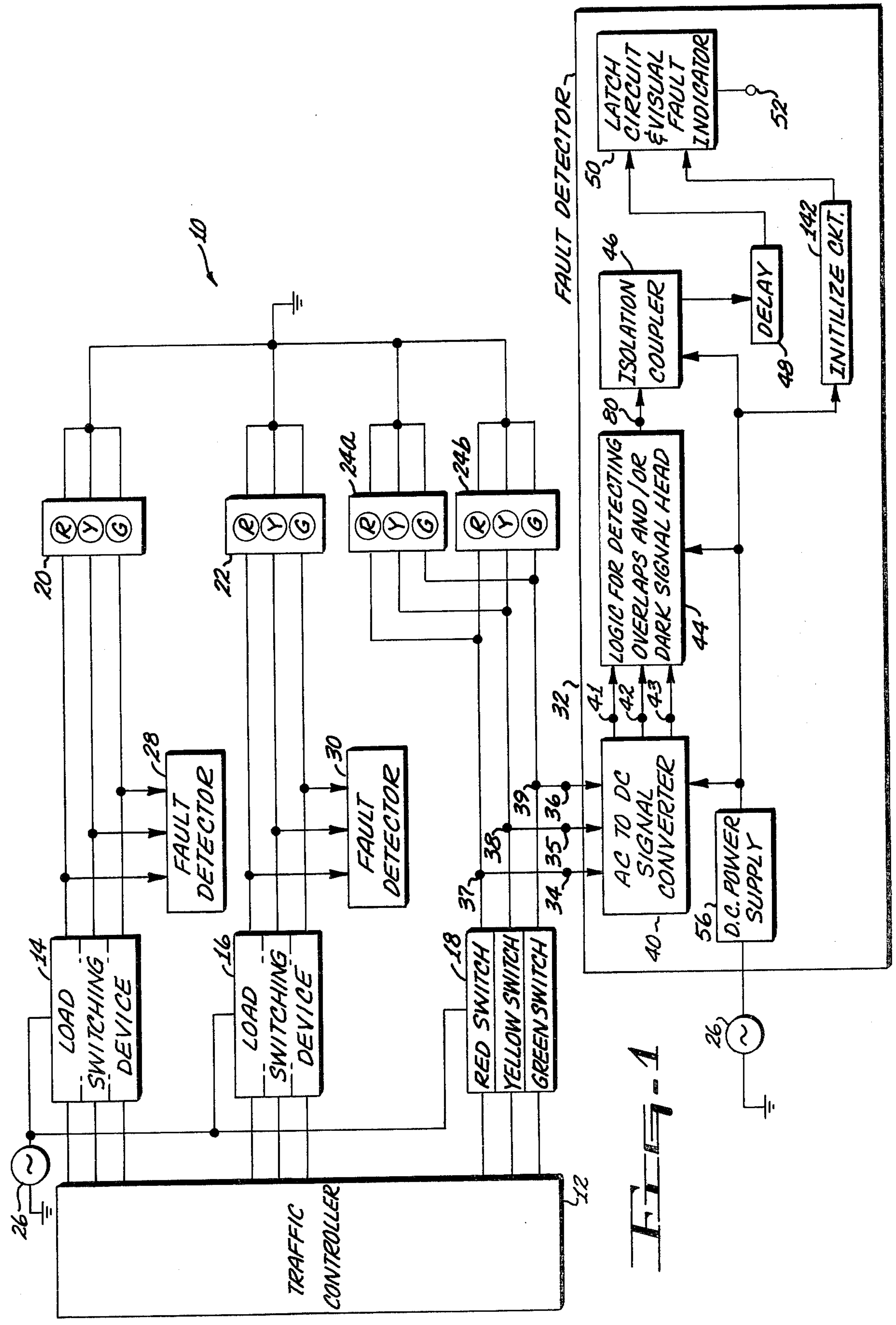
FIG. 1 is a block diagram of a traffic control system illustrating the relationships between subsystems of such a control system and the error detection circuit according to the present invention.

In FIG. 1 traffic control system 10 is provided with a traffic controller 12 which is the source of command, or control, signals which through a plurality of groups, or blocks, of load switches 14, 16, or 18, operate all of the traffic signal heads, or arrays, 20, 22, **24*a*, and 24*b* of system 10. Each of the signal heads 20, 22, 24*a*, 24*b* is illustrated as having a red traffic signal light, 20-R, 22-R, 24*a*-R, 24*b*-R, a yellow traffic signal light 20-Y, 22-Y, 24*a*-Y, 24*b*-Y, and green traffic light 20-G, 22-G, 24*a*-G, 24*b*-G. In FIG. 1 all of the arrays of traffic signals are indicated as being comprised of a single traffic head except those associated with the group of load switches 18 in which two traffic signal heads 24*a* and 24*b* are illustrated. Obviously, other types of traffic signal lights and arrangements of such lights are common. Each array is controlled by a block of load switches. Arrays 24*a* and 24*b* are controlled by the block or group of load switches 18**. In practice more than one array of traffic signal lights can be controlled by one block of load switches; in fact, all the lights used to control the flow of a single phase of traffic on a single road can be connected to and controlled by one group, or block, of load switches if desired.

Each block of load switches, 14, 16, 18 is comprised of a load switch for each type of traffic signal light, or light having the same function, i.e., all the red signal lights of the one or more arrays of signal lights **24*a*, 24*b* for example, are controlled by load switch 18-R, the yellow by load switch 18-Y, and the green by 18-G. Red signal lights 24*a*-R and 24*b*-R are connected in parallel through load switch 18-R to an electrical power supply 26**, which is normally a source of 60 cycle AC at 115 or 220 volts, such as is available from an electric utility.

An error, or fault, detection circuit 28, 30, 32, is associated with and electrically coupled, or connected, to each of the energizing circuits between the load switches of a block of switches and the signal lights each switch of each such block controls. Each error detector circuit has input terminals each of which is connected to a terminal of a load switch, for example. Error detector 32, for example, has three input terminals 34, 35, 36, which are connected to terminals 37, 38, 39 of load switches 18-R, 18-Y, and 18-G. An AC potential will be present at the input terminals 34, 35, and 36 when the corresponding signal lights of signal heads **24*a*, 24*b* are energized. AC voltages applied to the input terminals 34, 35, 36 of error detector 32 are applied to AC to DC signal converter circuits 40 to produce binary logic signals at the output terminals 41, 42, 43 of circuit 40. The value of the logic signal at terminal 41, for example, would be equal to or greater than +3.5 volts, or a logical 1, if an AC voltage is present at terminal 37 of load switch 18-R and a value of 0 volts, or a logical 0, if no AC voltage is present at terminal 37**.

Similarly the logic signal at terminal 42 is determined by whether an AC voltage or signal is present or absent at terminal 38 and the logic signal at terminal 43 is also determined by whether an AC voltage is present or absent at terminal 39 of load switch 18-G.

The binary output signals of AC/DC circuits 40 are applied to logic circuit 44 which produces one type of output signal if there are any overlaps, i.e., the logic signals applied to circuit 44 indicate that two or more signal lights are energized at the same time, or if no signal light is energized. The output of logic circuit 44 is applied through isolation coupler 46 to delay circuit 48. The output signal of logic circuit 44 is delayed, i.e., it must be present for a predetermined period of time before latch circuit 50 is energized. The period of delay is selected so that the normal, or planned, overlap of yellow and green signals, for example, will not cause an error signal to be produced by latch circuit 50 or an error, or fault, signal be applied to output terminal 52 of error detector 32.

Latch and visual fault circuit 50 when energized by a signal from delay circuit 48 remains energized as long as power is applied to it and when energized it also produces a visible signal. In a preferred embodiment each error detector is also provided with a conventional DC power supply 56 to provide direct current voltages of the proper magnitudes to the various subsystems of error detector circuit 32.

Figure 2:
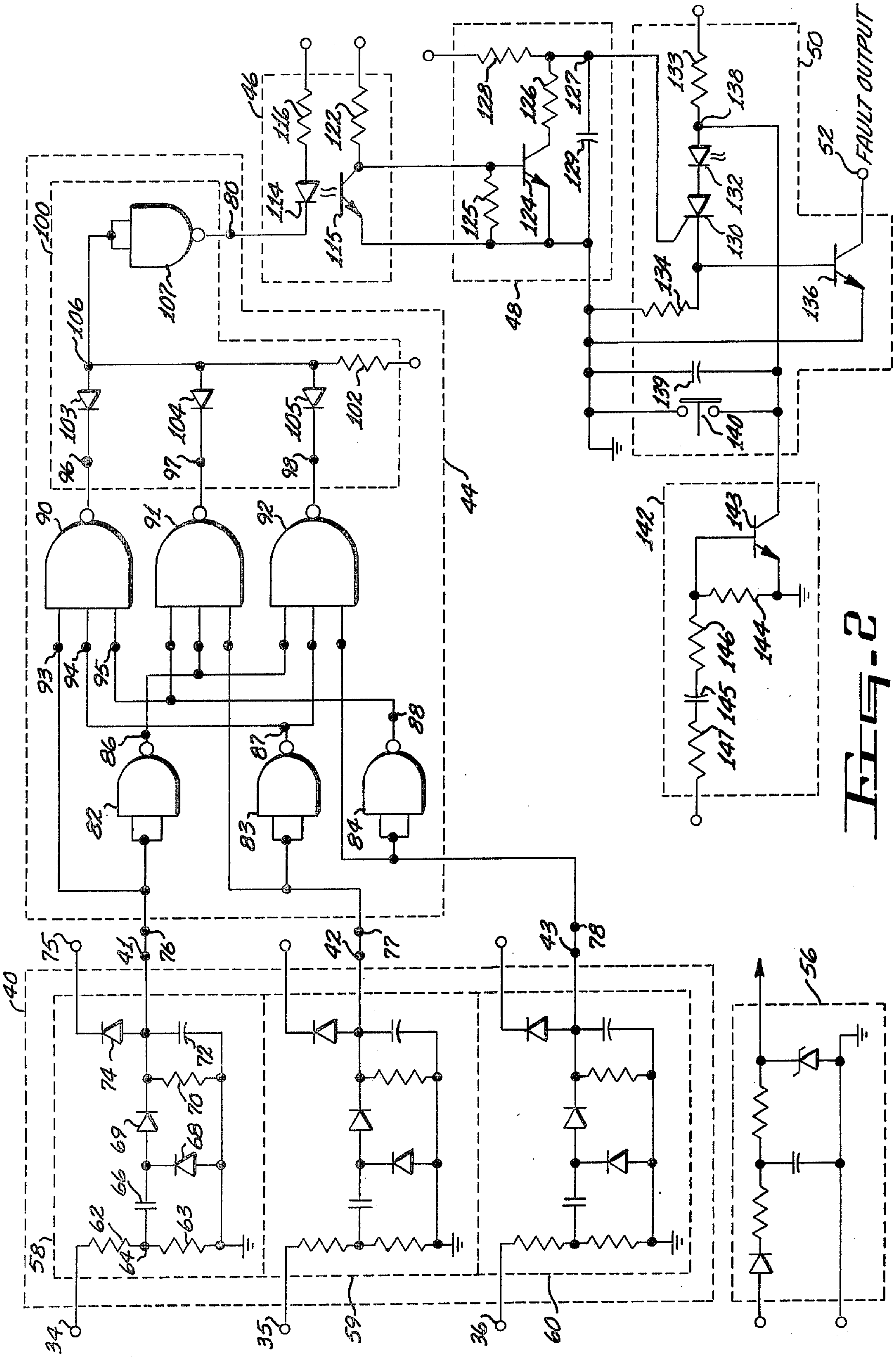
FIG. 2 is a schematic diagram of a preferred embodiment of the error detection circuit.

In FIG. 2, AC to DC signal converter 40 consists of three AC to DC converter circuits 58, 59, and 60. Since circuits 58, 59, and 60 are substantially identical, thus a detailed description of circuit 58 only will be provided.

Input terminal 34 of error detector 32 is connected to terminal 37 of load switch 18-R so that when switch 18-R is closed it completes an electrical circuit from AC power supply 26 through red lights 24a-R and 24b-R to energize or turn on lights 24a-R, 24b-R, and an AC voltage is present at terminal 37. This voltage is applied across resistors 62 and 63 of circuit 58. Since resistors 62 and 63 which are connected in series, and one terminal of resistor 62 is connected to the input terminal 34, resistors 62, 63 are a voltage divider. The voltage at terminal 64 between resistors 62 and 63 is coupled through capacitor 66 to a half wave rectifier circuit comprised of diodes 68, 69 and resistor 70. Capacitor 66 charges through diode 68 when the potential at terminal 64 is negative going and discharges through diode 69 and resistor 70 when the potential of terminal 64 is positive going. Capacitor 72 filters or smoothes the variation in the positive DC potential at output terminal 41 of AC to DC converter circuit 58. Diode 74 which is connected between output terminal 41 and terminal 75, which is adapted to be connected to a positive DC voltage source, suppresses transients in the output voltage at terminal 41 and limits the output voltage at terminal 41 substantially to the maximum value of the DC supply, +6.8 volts in a preferred embodiment, plus the voltage drop across diode 74, +0.7 volts in a preferred embodiment.

Thus, the maximum positive excursion of the voltage at output terminal 41 is substantially +7.5 volts DC in the preferred embodiment. The values of the components of the AC/DC converter circuit 58, for example, are chosen so that a nominal voltage of +4 volts DC is maintained across resistor 70 as long as an AC voltage of the desired magnitude is applied to the input terminal 34. When no AC voltage is applied to terminal 34 any voltage stored across capacitor 72 will discharge through resistor 70 so that the voltage across resistor 70 and at output terminal 41 under these conditions goes to 0 volts, or ground.

The voltages at output terminal 41 of converter circuit 58 have two values, +3.5 volts DC or greater when an AC voltage is applied to input terminal 34 and 0 volts, or ground, when no AC signal is applied to terminal 34. Thus, the output voltages of circuit 58 have two values and can be deemed to be a binary logic signal having a symbolic or representative value of 1 when its actual value is +3.5 volts or greater and 0 when its value is 0 volts, or it is at ground potential. In the preferred embodiment, a binary 1 signal at terminal 41 represents that an AC voltage is present at terminal 37 of load switch 18-R which occurs if switch 18-R is closed and lights 24a-R and 24b-R are energized. A binary 0 at terminal 41 represents the absence of an AC voltage at terminal 37 which could be caused, for example, by a failure of signal light 24a-R, and 24b-R of switch 18-R, of power supply 26, or of the conductors interconnecting them. A logical 0 signal at terminal 41 could also be caused by switch 18-R being open which could be because it is not commanded to be closed by a command signal from traffic controller 12.

In a similar manner circuits 59 and 60 produce at their output terminals 42, 43, binary or logic signals having values denoted 1 or 0 which indicate the presence or absence of an AC voltage at terminals 38 and 39, respectively, of load switches 18-Y and 18-G. The binary signals at output terminals 41, 42, 43 of converter circuits 58, 59, 60 are applied at the input terminals 76, 77, 78 of logic circuit 44. Logic circuit 44 produces an error signal at its output terminal 80 having a binary value of 0, or ground potential if more than one signal light controlled by a block of load switches is energized at one time; or if all signal lights controlled by the load switches of the block are off at the same time. FIG. 3 is a truth table showing the relationships between all possible combinations of the logic signals R, Y, and G and the desired logical output A at output terminal 80 of logic circuit 44. The foregoing conditions can be written in Boolean logic as follows:

$$\overline{G}\,\overline{Y}R + \overline{G}Y\overline{R} + G\overline{Y}\,\overline{R} = A \quad \text{(Eq. 1)}$$

R, Y and G represent the logic signals applied to terminals 76, 77 and 78, of logic circuit 44 produced by circuits 58, 59 and 60, respectively. $\overline{R}\ \overline{Y}\ \overline{G}$ are the complements of R Y G. Thus if R = 1, $\overline{R}$ = 0. The complements of R Y G are produced by inverting, or complementing them. Thus, logic signal R which is applied to input terminal 76, is inverted by inverter 82, logic signal Y by inverter 83, and logic signal G by inverter 84. In a preferred embodiment inverters 82, 83 and 84 are two input nand gates. Thus, logic signal R is applied to both input terminals of nand gate 82. The logic signals at output terminals 86, 87 and 88 of nand gates 82, 83, 84 are $\overline{R}\ \overline{Y}$ and $\overline{G}$.

Three, three input nand gates 90, 91, 92 are connected to input terminals 76, 77, 78 and terminals 86, 87, 88 as illustrated in FIG. 2 to satisfy Eq. 1, supra. For example, the first term of Eq. 1 $\overline{G}\ \overline{Y}$ R is implemented by connecting input terminal 93 of gate 90 to terminal 76 so that logic signal R is applied to terminal 93. Terminal 94 of gate 90 is connected to output terminal 87 of inverter 83 so that $\overline{Y}$ is applied to terminal 94. Output terminal 88 of inverter 84 is connected to input terminal 95 of gate 90 so that $\overline{G}$ is applied to terminal 95. In a similar manner the proper logic signals are applied to the input terminals of gates 91 and 92 to satisfy Equation 1.

The output signals of gates 90, 91, 92 at their respective output terminals 96, 97, 98, depend on the signals supplied to their respective input terminals. Thus, gate 90 will produce a logical zero, or a zero voltage at its output terminal 96 if logic signals $\overline{G}$, $\overline{Y}$ and R are all logical ones, i.e., have a value of +3.5 volts DC, for example. Gate 91 will produce a zero (0) logic signal at its output terminal 97 if $\overline{G}$ $\overline{R}$ and Y are logical ones, and gate 92 will produce a zero logic signal at its output terminal 98 if $\overline{R}$, $\overline{Y}$ and G are all logical ones.

The output signals of gates 90, 91, 92 are applied as three input signals to discrete and circuit 100 which is comprised, in the preferred embodiment, of a resistor 102 and three diodes 103, 104, 105. One terminal of resistor 102 is connected to a source of DC potential, +6.8 volts DC in a preferred example, and the other terminal is connected to the anodes of the diodes 103, 104, 105. The cathode of diode 103 is connected to the output terminal 96 of gate 90, the cathode of 104 to the output terminal 97 of gate 91 and the cathode of diode 105 is connected to the output terminal 98 of gate 92. When the output of any one of the gates 90, 91, or 92 is a logical 0 and thus at zero potential such as gate 90, for example, diode 103 will conduct and the potential at terminal 106 of gate 100 will be a logical zero (0) or be substantially at ground potential.

Any other combination of the logic signals than those specified in Eq. 1, supra, will produce a logical 1 at terminal 106, i.e., all the output signals at terminals 96, 97, 98 will be logical 1's so that the value at 106 will approach the value of the DC potential applied to the resistor 102. The logic signal at terminal 106 is inverted by inverter 107 so that the signal at output terminal 108 is the complement of the logic signal at terminal 106. The logic signal, or DC voltage at output terminal 80 of logic circuit 44 is coupled by isolation coupler 46 to delay circuit 48.

Isolation coupler 46 is comprised of a light emitting diode 114 and a photo transistor 115 which are packaged so that when light emitting diode 114 emits electromagnetic radiation, photo transistor 115 conducts. Optical coupling of logic circuit 44 to the balance of the error detection circuit 32 has the advantage of providing complete electrical isolation between the circuits. In the preferred embodiment light emitting diode 114 and photo transistor 115 combination is a 4 N 25. The anode of the light emitting diode 114 is connected through resistor 116 to a source of DC potential and its cathode is connected to the output terminal 80 of logic circuit 44. Photo transistor 115 has its collector connected to a source of DC potential through collector resistor 122 and its emitter connected to ground.

When the conditions of logic Eq. 1, supra, are satisfied, i.e., the logic signal at output terminal 80 of logic circuit 44 will be a logical 1 and light emitting diode 114 will be cut off. This also biases off photo transistor 115. Thus, when the condition of Eq. 1, supra, are not satisfied, or a fault condition exists, the logic signal at terminal 80 will be a logical 0. which permits photo diode of 114 to be energized, or turned, to emit light, which light falling on photo transistor 115 causes it to conduct. NPN transistor 124 of delay circuit 48 has its base connected to the collector of photo transistor 115. The base of transistor 124 is also connected to ground through resistor 125. The collector of transistor 124 is connected through resistor 126 to the common junction 127 of the resistor capacitor network comprised of resistor 128 and capacitor 129.

In the absence of an error, or fault, signal from logic circuit 44, i.e., terminal 80 is a logical 1 and thus at +3.5 volts DC or higher, photo transistor 115 is off and transistor 124 will be biased on maintaining the potential of junction 127 substantially at ground potential. When an error signal is produced by logic circuit 44, i.e., terminal 80 is a logical 0, and thus substantially at ground potential, current will flow through photo diode 114, and the light produced by photo diode 114 causes photo transistor 115 to conduct which lowers the base voltage of transistor 124 substantially to ground to bias off transistor 124. This allows capacitor 129 to charge through resistor 128 at a rate which is a function of the magnitude of the resistance of resistor 128 and the capacitance of capacitor 129 or the time constant of the RC circuit comprised of resistor 128 and capacitor 129.

Terminal 127 of delay circuit 48 is connected to the gate of a silicon controlled rectifier (SCR) 130 of latch circuit 50. The anode of SCR 130 is connected through a photo diode 132 and resistor 133 to a source of positive DC voltage. The cathode of SCR 130 is connected through cathode resistor 134 to ground. Output transistor 136 has its base connected to the cathode of SCR 130, its emitter to ground, and its collector to the output terminal 52 of detector circuit 32.

Capacitor 139 is connected between ground and terminal 138, which is between the anode of photo diode 132 and resistor 133 to provide a low impedence shunt for high frequency voltage pulses around SCR 130. Push button switch 140 is connected in parallel with capacitor 139 to ground terminal 138 and thus turn off SCR 130 when switch 140 is closed.

Initialization circuit 142 provides a delay between the initial application of power to traffic control system 10, a period of time that may be used by conventional means which are not illustrated, to check the operation of traffic controller 12. NPN transistor 143 has its collector connected to terminal 138 in the anode circuit of SCR 130 and its emitter is connected to ground. The base of transistor of 143 is connected to ground through resistor 144 and to one terminal of capacitor 145 through resistor 146. The other terminal of capacitor 145 is connected to a source of positive DC voltage through resistor 147.

When power is first applied to traffic control system 10 a DC voltage is also applied to initialization circuit 142, and current will flow from capacitor 145 through resistors 146 and 144. The voltage across resistor 144 will forward bias the base to emitter junction of transistor 143 which effectively clamps terminal 138 and thus the anode of SCR 130 to ground potential so that SCR 130 will not conduct as long as transistor 143 is biased on. After a period of time determined by the characteristics of the components of the initialization circuit 142, the base potential of transistor 143 will approach ground and will turn off transistor 143. Thus, initialization circuit 142 will not prevent the potential of terminal 138 from rising to the value of the voltage applied to resistor 133.

As long as transistor 124 is conducting, the gate of SCR 130 will be at such a potential that SCR 130 will not fire, or conduct. If transistor 124 is turned off because photo transistor 115 is conducting, the voltage of the gate of SCR 130 will rise at a rate determined by the time constant of the RC circuit including resistor 128 and capacitor 129 until it reaches the trigger voltage of SCR 130. It should be noted that if at any time before the voltage at terminal 128 reaches the magnitude necessary to trigger on SCR 130, photo transistor 115 is turned off and transistor 124 turned on. This will stop the rise of the voltage at terminal 128, in fact it will lower it, and latch circuit 50 will not be turned on and latched. However, once the voltage of terminal 127 reaches the firing potential of SCR 130, SCR 130 will conduct and continue to conduct irrespective of the voltage of its gate until power is no longer applied to SCR 130 either by its anode being grounded by closing switch 140 or by shutting off the power supply. As long as SCR 130 conducts, the light emitting diode 132 which is in its anode circuit will emit visual radiation. Such a visual signal indicates to a serviceman the block of switches and the associated traffic signal lights which were the source of the error, or fault, signal. The fault signal at output terminal 52 can be used to cause the traffic control system 10 to go into an appropriate mode of operation such as a flashing mode, until such time as the system has been repaired.

From the foregoing it is believed obvious that the error detection circuit comprising my invention provides an error, or fault, signal when single phase traffic signal lights controlled by a single block of load switches fails to operate in the prescribed manner. By providing an optical signal that identifies the block, or group, of traffic signal lights and their associated load switches in which the error occurred, the error detector facilitates the identification of the exact cause of the error and thus makes it possible for a serviceman to repair the system with a minimum of delay.

It should be evident that the various modifications can be made to the described embodiment without departing from the scope of the present invention.

What I claim as my invention is:

1. In a traffic control system having a traffic controller, a plurality of load switches connected to and controlled by command signals from the traffic controller, traffic signal lights having different functions, traffic signal lights of a given function controlling the flow of traffic on one street of a plurality of intersecting streets being energizable from a source of AC potential by an energization circuit which includes a load switch, the load switches controlling the traffic signal lights for controlling the flow of traffic on one street constituting a group, the improvements comprising:

(a) a plurality of AC-DC converter circuits, one for each load switch of a given group of load switches;

(b) circuit means for respectively coupling a different AC-DC converter circuit to each energization circuit, each AC-DC converter circuit producing a logic signal having one value when AC potential is applied to it and a second value when no AC potential is applied to it;

(c) a logic circuit to which the logic signals from the AC-DC converter circuits are applied, said logic circuit producing an error signal if two traffic signal lights of a given group having inconsistent functions are energized simultaneously, or if no traffic signal lights of a given group are energized simultaneously;

(d) a time delay circuit;

(e) optical coupling means for applying the error signal produced by the logic circuit to the time delay circuit, said time delay circuit, if the error signal is applied continuously to it for a predetermined period of time, producing an output signal;

(f) circuit means including a silicon controlled rectifier and a photo diode, the photo diode being connected to the anode circuit of the silicon controlled rectifier, the output of the time delay circuit being connected to the gate of the silicon controlled rectifier, said output of the time delay circuit triggering the silicon controlled rectifier into conduction and causing the photo diode to produce visible radiation;

(g) an initializing circuit connected to the anode circuit of the silicon controlled rectifier for maintaining the voltage applied to the anode of the silicon controlled rectifier substantially equal to that of its cathode for a predetermined period of time after power is applied to the traffic control system; and (h) switch means connected to the anode circuit of the silicon controlled rectifier for maintaining the voltage applied to the anode of the silicon controlled rectifier substantially equal to that of its cathode when the switch means is closed.

2. In the traffic control system of claim 1 in which the optical coupling means includes a photo diode and a photo transistor.

3. In the traffic control system of claim 1 in which the switch means is manually operated.

4. In a traffic control system of the type wherein there is provided a traffic controller for producing command signals, a plurality of load switches responsive to said command signals, and a plurality of traffic signal lights each coupled to one of said load switches, the improvements comprising:

a. first means coupled to each of said load switches for indicating when each of said load switches is energized;

b. second means for detecting when more than one load switch controlling a single phase of traffic is simultaneously energized or when no load switches controlling a single phase of traffic are energized and for producing an error signal in response thereto;

c. a time delay circuit coupled to said second means for receiving said error signal and producing an output signal when said error signal has been applied thereto for more than a predetermined period of time;

d. a latch circuit coupled to the output of said delay circuit and responsive thereto for producing a fault signal; and e. third means coupled to said latch circuit for producing a visual signal in response to said fault signal.

5. The traffic control system of claim 4 wherein said first means comprises an AC-DC signal converter circuit.

6. The traffic control system of claim 5 further comprising a light emitting diode and a photo transistor for applying said error signal to said delay circuit.

7. The traffic control system of claim 6 wherein said third means is a light emitting diode.

8. An error detecting circuit for a single phase of traffic control system of the type wherein there is provided a traffic controller, a plurality of load switches coupled to and controlled by said traffic controller, said load switches arranged to control single phase traffic, a plurality of traffic signal lights each one of which is turned on and off by an energization circuit coupled between one of said load switches and said light; said error detecting circuit comprising:

a. first means coupled to each of said load switches for producing signals indicative of the states of each of said load switches;

b. a logic circuit coupled to said first means and responsive to said signals for detecting when more than one of said load switches controlling said single phase is energized and for producing an error signal in response thereto;

c. a time delay circuit responsive to said error signal for producing an output signal if said error signal is applied thereto continuously for more than a predetermined period of time;

d. a latch circuit coupled to said delay circuit for producing a fault signal when said latch switches from a first to a second state in response to said output signal; and e. third means coupled to said latch circuit for producing a visual signal when said latch circuit is in its second state.

9. The error detecting circuit of claim 8 wherein said first means comprises an AC-DC signal converter circuit.

10. The error detecting circuit of claim 9 further comprising a light emitting diode and a photo transistor for coupling said error signal to said delay circuit.

11. The error detecting circuit of claim 10 wherein said third means for producing a visual signal is a light emitting diode.

12. An error detector for use in a single phase of a traffic control system of the type wherein a plurality of traffic signal lights are selectively energized comprising, in combination:

a. first means for monitoring the states of each of said plurality of signal lights controlling said single phase of traffic; and b. second means for detecting when at least two of said lights controlling said single phase are on or when none of said lights controlling said single phase are on and for generating an error signal in response thereto.

13. An error detector according to claim 12 wherein said first means for monitoring comprises:

a. third means for generating a plurality of signals, each one of said plurality of signals indicative of the condition of one of said traffic control lights.

14. An error detector according to claim 13 further including:

a. delay means having an input coupled to said second means for receiving said error signal; and b. fourth means coupled to said delay means for triggering an alarm.

15. An error detector according to claim 14 wherein said third means includes a plurality of AC to DC converters, one for each of said plurality of traffic signal lights.

16. An error detector according to claim 15 wherein said alarm is a visual alarm.

17. An error detector according to claim 16 wherein said second means comprises logic means having inputs coupled to said plurality of signals and producing said error signal at its output.

* * * * *

UNITED STATES PATENT AND TRADEMARK OFFICE

CERTIFICATE OF CORRECTION

PATENT NO. : 4,135,145

DATED : January 16, 1979

INVENTOR(S) : Terrence F. Eberle

It is certified that error appears in the above-identified patent and that said Letters Patent are hereby corrected as shown below:

Claim 4, line 10, after the word "means" insert the words ---coupled to said first means--

Claim 12, line 8, after the word "means" insert the words ---coupled to said first means---

Signed and Sealed this

*First* Day of *May 1979*

[SEAL]

*Attest:*

RUTH C. MASON
*Attesting Officer*

DONALD W. BANNER
*Commissioner of Patents and Trademarks*